Patented Sept. 20, 1949

2,482,520

UNITED STATES PATENT OFFICE 2,482,520

MANUFACTURE OF RENNET PASTE

Everette C. Scott and George W. McDonald, Ashton, Ill., assignors to Swift & Company, Chicago, Ill., a corporation of Illinois No Drawing. Application October 22, 1946, Serial No. 704,982

4 Claims. (Cl. 195—68)

The present invention relates to the enzyme rennin and it has to do more particularly with the preparation of a rennet paste adapted for cheese making.

In the manufacture of cheese, the enzyme rennin is extensively used in curdling milk. The curd resulting from the precipitation of the casein by the rennet is subsequently modified by various ripening treatments to produce the variety of cheese desired. In addition to its coagulating function, rennet also plays an important part in the ripening process. Inferior rennet extracts adversely affect the final cheese, for example by producing off-flavors therein.

Rennin is obtained by extracting with salt brine the chopped fourth stomachs or rennets of suckling kids, lambs or calves. The rennet extract is produced in concentrated form, and is generally used in a dilute condition. Rennet extract is also produced in powdered or in tablet form. Another way of using rennin is in the form of a paste.

Rennet paste is used primarily in the manufacture of Italian type cheeses. In addition to coagulating the milk, rennet paste imparts to the cheese a distinctive piquant flavor, characteristic of Italian cheeses. Heretofore, rennet paste has been made by grinding to a paste the dried, salted rennets of slaughtered milk-fed kids, lambs and calves. The stomachs taken from the animals are tied at the ends to retain in the stomachs the contents thereof at the time of slaughter of the animals. The stomachs are then salted and allowed to dry for a week or more, after which time they are ground to a paste. Often salt, vinegar, and occasionally flour are added to the hashed stomachs in making the paste.

Rennet paste obtained as a result of the above described procedure is unsanitary and the use thereof in the preparation of food products is generally prohibited. This rennet paste is usually highly contaminated with harmful bacteria due to the large amounts of objectionable foreign material taken into the stomachs by the animals before slaughter.

It has also been proposed heretofore to prepare rennet paste from rennet stomachs which have been first flushed with water, and the stomachs thereafter filled with milk, salted and allowed to dry preparatory to forming the paste. The product resulting from this process is often rancid, in addition to being unsanitary and non-uniform.

An object of the invention is to prepare a clean and sanitary rennet paste.

Another object of the invention is to prepare rennet paste possessing superior flavor-giving characteristics.

A further object of the invention is to prepare a rennet paste for use in the manufacture of edible products.

A still further object of the invention is to provide a more uniform rennet paste.

Yet another object of the invention is to prepare a rennet paste relatively free of noxious bacteria, particularly the gas producing types.

Other objects and advantages of the invention will be apparent from the description of the invention given below.

The invention contemplates mixing purified rennin-containing material with the curd obtained from homogenized raw whole milk. The purified rennet material may be clean hashed rennet stomachs, as hereinafter more fully to be described, or the extract of rennet stomachs in liquid or dry form. A paste having a definite acid and salt content is thereafter formed of the resulting mixture. Before using, the paste may be aged whereby the characteristic flavor and odor thereof are enhanced.

In order to obtain a rennet paste of superior flavor properties the use of homogenized raw whole milk is preferred. By using raw whole milk the action of the enzyme lipase on the fat contained in the milk is maintained unimpaired. Lipase breaks down the fat, a process which is responsible for imparting to the final paste product of flavor-giving properties thereof. Homogenization of the milk serves to subdivide the fat particles and thus facilitate the action of the lipase thereon. In place of homogenization, the milk may be run through a high-pressure pump provided with a fine screen, thereby breaking up the fat particles. Any treatment of the milk is suitable, however, which removes the protein film surrounding the fat particles so that the fat may be attacked by the lipase.

In place of whole milk, we may employ skim milk or reconstituted dried milk. To these materials, as well as to whole milk, a suitable amount of homogenized butterfat is added in order to supply or increase the fat content necessary to effect the desired flavor properties in the final paste. The amount of added homogenized butterfat may be varied within wide limits, a more rapid and intense flavor development being obtained with curds containing larger amounts of fat. For most purposes, homogenized butterfat is added in an amount similar to that in whole milk. In the claims, by "homogenized whole milk," is meant not only whole milk, but also other milk materials treated with fat, as hereinabove described.

Although we may employ pasteurized milk, particularly milk to which homogenized fat is added, it is preferred to use raw milk. Pasteurization of milk destroys the effectiveness of lipase to split the fat, thus impairing the flavor properties of the paste.

According to one embodiment of the invention, hashed rennet stomachs are added to homogenized raw whole milk and the milk curdled in the presence of the rennet material. Alternatively, the hashed stomachs may be mixed with pre-formed curd. The mixture of curd and hashed rennets is then ground, the resulting paste mass mixed with salt and the pH thereof adjusted.

We may also prepare rennet paste by mixing liquid or dry rennet extract with the curd obtained from whole milk, adding salt thereto and thereafter forming a paste of the desired consistency by means of liquids, such as water, skim or whole milk, and absorbent material.

In the preparation of the paste with hashed rennet material, the stomachs are split open, and thoroughly washed with water. The temperature of the water is maintained below the point at which the lipase and rennin would be dissolved thereby. The temperature of the wash water is kept below 100° F., and is maintained preferably between 80° and 90° F.

After the stomachs have been cleaned, they are ground, hashed or chopped into a fibrous pulp. This pulp is added to homogenized raw milk, and the mixture allowed to stand until a coagulum, having the consistency of cheese curd, is formed. The curd is broken or cut into small pieces to cause expulsion of the whey, and the pieces allowed to settle and separate from the whey, after which the whey is drained and the curd ground to a paste. If the paste is too fluid, absorbent material may be incorporated into the paste to lower the moisture content thereof. When the paste is of the desired consistency, enough salt is added to bring the salt content of the paste to within the range of about 15 to 45 per cent, after which the pH, or the acidity, of the paste is adjusted.

Curdling of the milk is effected by any suitable conventional method. The curd may be formed, for example, by allowing the milk to remain overnight at a temperature of about 68° to 70° F. In case it is desired to accelerate curdling of the milk, the coagulating action of the rennin in the stomachs may be aided by addition of lactic acid bacteria starter. Amounts of starter of 1 to 5 per cent, based on the quantity of milk used, may be employed, depending on the speed of coagulation desired.

After the curd is formed, it is cut into pieces to facilitate expulsion of the whey. The curd may be cut with a conventional wire curd knife into ¼- to ⅜-inch pieces. A moisture content in the curd of around 50 per cent has been found to be satisfactory.

The ratio of stomach material to milk may be varied within wide limits. If a strong paste is desired, greater amounts of stomachs for the same amount of milk may be employed. When a weak paste is desired, lesser amounts of rennets are used. For example, we have found that a suitable paste may be prepared in the ratio of about 25 to 200 pounds of rennet stomachs to 100 gallons of milk, When the paste is formed, sufficient acid material is added thereto to bring the pH of the paste to within the range of about 4 to 5, of pH of about 4.6 being preferred. Suitable acid substances are inorganic acids, such as phosphoric and sulfuric; organic acids, such as acetic, lactic, citric, and tartaric. It is preferred to adjust the acidity of the paste by means of a mixture of equal amounts of lactic and acetic acids. This acid mixture possesses antiseptic properties which may be advantageously utilized in keeping the paste wholesome. When it is desired to use the paste soon after the preparation thereof, the step of adjusting the acidity thereof may be omitted. Holding the pH within the prescribed range prevents the growth of the putrefying bacteria but promotes the growth of the lactic acid producing micro-organisms. It is therefore particularly advantageous to adjust the pH of the paste when it is desired to age it, thereby preventing its deterioration and aiding the development of the desired flavor characteristics.

The consistency of the paste may be varied within wide limits. In the event that a firm paste is desired a material may be added to the paste to absorb moisture. Whole milk powder is the preferred absorbent, although other substances, such as skim milk powder and flour are satisfactory. A moisture content in the paste from about 40 to 50 per cent is usually satisfactory for most purposes.

The following example is given to illustrate one method of operation of the invention. 200 lamb rennets and 100 calf rennets were split open and washed under a spray with water at 80° F. until the stomachs were clean. The stomachs were then hashed in a silent cutter, and the resulting fibrous mass mixed with 100 gallons of milk that had previously been homogenized in a standard homogenizer at 2,000 pounds pressure. Five per cent of a lactic acid producing culture of the type used in cheese making was added to the milk. The temperature of the milk was maintained at 88° F. Coagulation of the milk was complete in about 20 minutes, after which the temperature of the mixture of curd and whey was raised to about 105° F. in order to facilitate the separation of curd and whey by stirring. Stirring was continued until the curd was of a consistency similar to that obtained in making cream cheese. The whey was then drained from the curd and an amount of salt, equivalent to 30 per cent by weight of the curd product, was mixed therewith. Enough whole milk powder was added to adjust the moisture content to 40 per cent, after which the salted mass was put through a silent cutter. During the grinding operation an acid mixture containing equal amounts of lactic and acetic acid was added to the material until the pH thereof was 4.5.

As a further illustrative example, 90 pounds of clean hashed rennet stomachs were mixed with 180 pounds of a pre-formed cream cheese type curd. To this mixture were added 126 pounds of salt and 25 pounds of whole milk powder. The salted mass was then ground in a silent cutter and 625 cc. of an acid mixture composed of equal amounts of lactic and acetic acids were incorporated therein so that the resulting paste had a pH of 4.63.

In accordance with another embodiment of the invention, in place of clean hashed rennet stomachs we may employ other purified rennet material. We have found that we may prepare a suitable rennet paste with either liquid or dry rennet extracts as the source of the enzyme. Paste prepared with the extracts comprises mainly the dried or liquid extract, curd obtained from homogenized raw whole milk, salt and sufficient acid material to accomplish the desired pH in the paste. In order to obtain the desired consistency in the final product, we may employ an edible organic absorbent material, such as whole milk powder, and water in sufficient amounts to achieve the desired properties in the paste.

The amounts of ingredients in the paste vary according to a number of factors, such as the strength desired in the final product, the consistency of the paste and the water content of the ingredients. For example, the moisture contents of the curd and liquid extract effect the amounts thereof to use and consequently the quantities of absorbent material and water to effect the desired consistency in the paste.

We have found that the amounts of ingredients may vary within about the following range:

|  | Parts |
|---|---|
| Rennet powder | 1 to 12 |
| Curd | 60 to 140 |
| Salt | 30 to 90 |

When it is desired to employ the liquid extract, about the following range is satisfactory:

|  | Parts |
|---|---|
| Liquid rennet extract | 1 to 13 |
| Curd | 100 to 231 |
| Salt | 50 to 150 |

The preferred formula comprises about 50 parts of curd and about 30 parts of salt to about one part of powdered rennet or two parts of the liquid extract.

Both extracts employed in the above formulas were of a commercial grade. One part of the powder, known in the trade as "Rennet Powder N. F.," was found to be capable of coagulating 25,000 parts of milk at 43° C. in 10 minutes. The liquid extract on the other hand was of such strength that 4 ounces thereof coagulated 1,000 pounds of milk having an acid content of 0.18 per cent in about 15 minutes at 90° F. In all cases, the curd had a moisture content of about 70 per cent.

After the essential ingredients have been proportioned and mixed, a paste may be formed of the resulting mixture by the use of water or any suitable liquid, such as skim or whole milk, and an absorbent material, such as whole milk powder. The acidity is adjusted as hereinabove described.

Although the paste may be used immediately after the preparation thereof, it is preferred to age it for a week or two. During the aging the fat continues to break down. Degradation of the fat particles causes the characteristic flavor in the paste, which is imparted to cheese made with paste. Moreover, in the case of paste made with hashed stomachs a greater amount of enzyme is liberated from the stomach tissues during aging. Aging of the paste may be accomplished by allowing it to stand in a curing room at temperatures of about 45° F. to 50° F.

Before using the paste in the manufacture of cheese, the paste is admixed with water and allowed to stand for a period of time so that the enzyme material may be dissolved in the water. The mixture is then strained and the liquid used in cheese making. The amounts of water employed in soaking the paste may vary within wide limits depending on the strength of the enzyme extract desired. We have found, for example, that a ratio of one pound of paste, prepared in accordance with the formulas hereinabove described, to one gallon of water produces satisfactory results. The rennet extract is then employed in accordance with the procedure suitable for making the type of cheese desired.

As an example of the application of the invention to cheese-making the following example illustrating the preparation of Romano cheese is given.

About 54 ounces of the rennet paste was intimately mixed with 3½ gallons of water at a temperature of 100° F. After standing for about 25 minutes, the mixture was strained through two layers of cheesecloth. The liquid was strained again through a cloth of fine mesh similar to thin muslin. After the second straining the liquid was ready to use in the manufacture of cheese. To 9,000 pounds of milk in a vat, which milk had a fat content of about 2.8 per cent, there was added about 2 per cent of commercial cheese starter. The temperature was adjusted to 86°–88° F. and the mixture allowed to stand for about one hour, or until the acidity was 0.18 per cent. At the end of this time, the liquid which had been prepared from the rennet paste was added to the milk and thoroughly mixed therewith. The milk was allowed to set until coagulation was complete, after which the curd was cut into ⅜-inch pieces by means of a wire curd knife. The temperature of the contents of the vat was raised slowly at the rate of 1 degree every 5 minutes for the first 15 minutes and 2 degrees every 5 minutes thereafter, until the temperature therein was 120° F., which required about 45 minutes. Stirring of the curd was continued at this temperature for another 45 minutes until the acidity was 0.3 per cent, at which time the curd was firm, somewhat like the firmness of cheddar cheese curd. The whey was then drained from the curd, and the curd placed in lined Romano cheese hoops, wherein the curd was pressed for about 15 minutes, after which the curd was dressed and pressed overnight. The following day the curd was removed from the hoops and placed in a brine solution. At the end of 24 hours the cheese was removed from the brine and salt was rubbed on the surface of the cheese. Salting was continued daily until the salt content of the cheese was 5 per cent and required 35 days. Upon completion of the salting operation, the cheese was washed and aged by placing in an aging room at about 50° F. for 10 months. The aged cheese was then dipped in black wax. The finished cheese had the characteristic Romano cheese flavor and was of superior quality.

Obviously, many modifications and variations of the invention, as hereinbefore set forth, may be made without departing from the spirit and scope thereof, and therefore only such limitations should be imposed as are indicated in the appended claims.

We claim:

1. The process of preparing a rennet paste adapted for cheese making and having superior keeping qualities and improved flavor and odor characteristics, which comprises: forming a paste of a curd containing about the fat content of whole milk curd and rennet material selected from the class consisting of purified hashed rennet stomachs, liquid rennet extract and powdered rennet extract, the rennet material being present in the ratio of about 1 to 12 parts to 60 to 100 parts of curd; and then adjusting the pH of said paste within the range of about 4 to 5 whereby the growth of putrefying bacteria is retarded and the development of desired flavor characteristics is promoted.

2. The process of preparing a rennet paste adapted for cheese making and having superior keeping qualities and improved flavor and odor characteristics, which comprises: forming a mixture of clean, hashed rennet stomachs and whole milk curd in the proportion of about 25 to 200 pounds of said stomachs to the amount of curd resulting from each 100 gallons of whole milk; mixing salt with the resulting mass to form a paste; and adjusting the pH of the paste to within the range of about 4 to 5 whereby growth of putrefying bacteria is retarded and the development of the desired flavor characteristics is promoted.

3. The process substantially as described in claim 2 wherein the pH is adjusted by the addition of about equal amounts of lactic and acetic acids.

4. The process of preparing a rennet paste adapted for cheese making and having superior keeping qualities and improved flavor and odor characteristics, which comprises: mixing a curd from about 100 gallons of homogenized, raw whole milk with about 25 to 200 pounds of clean, hashed rennet stomachs; adding salt and an absorbent material to produce a moisture content of about 40 to 50 per cent and to effect the desired consistency in the paste; adjusting the pH of the paste to about 4 to 5 and aging the resulting product whereby growth of putrefying bacteria is retarded and the development of desired flavor characteristics is promoted.

EVERETTE C. SCOTT.
GEORGE W. McDONALD.

REFERENCES CITED

The following references are of record in the file of this patent:

UNITED STATES PATENTS

| Number | Name | Date |
| --- | --- | --- |
| 1,732,375 | Nygood | Oct. 22, 1929 |
| 2,145,796 | Keil et al. | Jan. 31, 1939 |
| 2,337,947 | Thornby et al. | Dec. 28, 1943 |
| 2,376,848 | Hankinson | May 22, 1945 |